J. C. DAWSON
April 25, 1933. LOOSE LEAF BINDER Re. 18,806
Original Filed Feb. 28, 1931
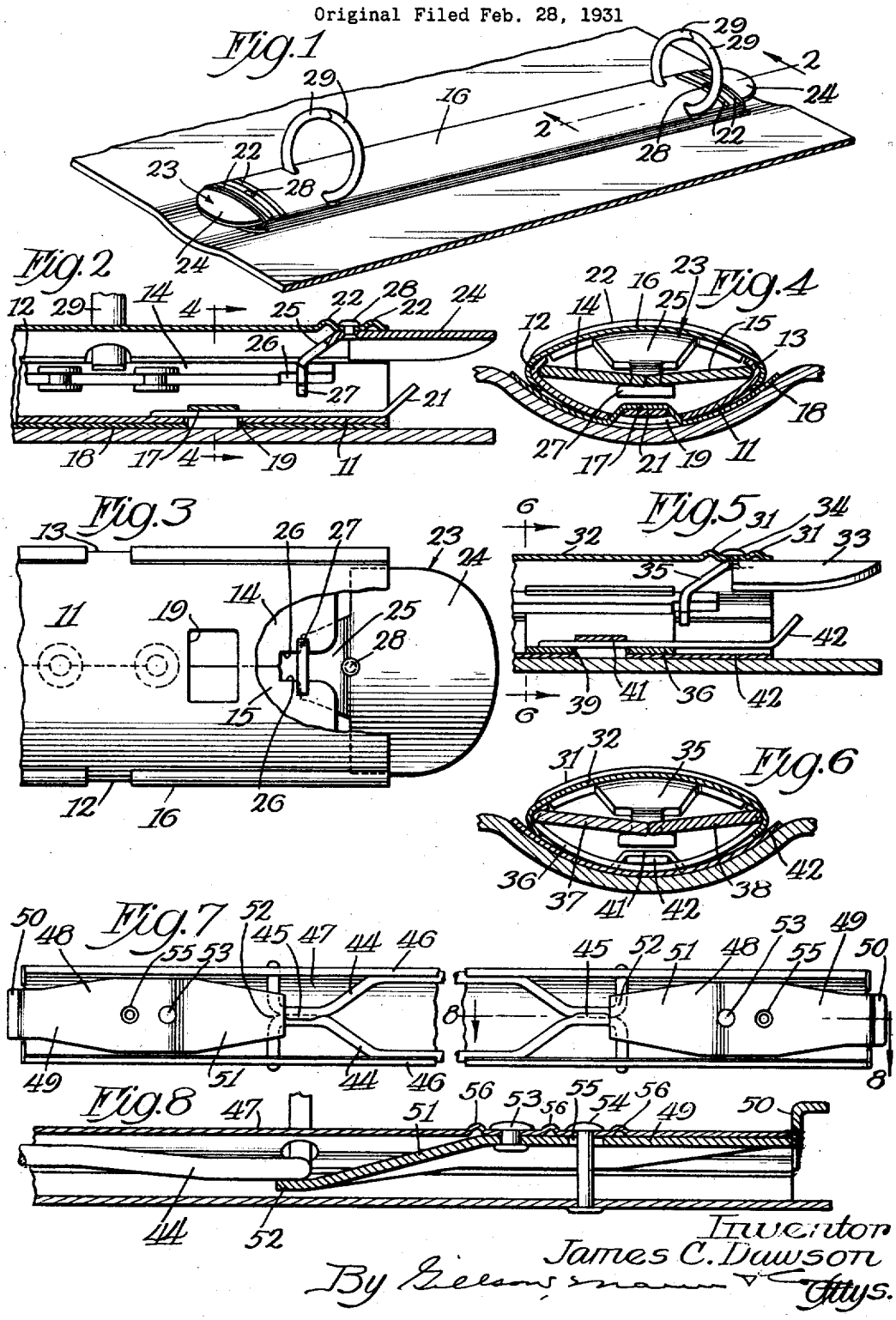
Inventor
James C. Dawson
By Gilson, Mann & Atty's.

Reissued Apr. 25, 1933 Re. 18,806

UNITED STATES PATENT OFFICE

JAMES C. DAWSON, OF WEBSTER GROVES, MISSOURI, ASSIGNOR TO ELMA N. DAWSON, OF WEBSTER GROVES, MISSOURI

LOOSE LEAF BINDER

Original No. 1,897,001, dated February 7, 1933, Serial No. 519,137, filed February 28, 1931. Application for reissue filed February 27, 1933. Serial No. 659,542.

This invention relates to loose leaf binders, and has for its objects to provide simple means for the attachment of booster levers to the cover plates of binders, and to provide booster levers and means for their attachment to binders of the wire arch frame and spring cover types.

These and other objects of the invention will become apparent from the specification and the appended drawing, in which Fig. 1 is a perspective view of the binder and portion of the book;

Fig. 2 is a vertical, longitudinal section of the end portion of the binder, on the line 2—2 of Fig. 1;

Fig. 3 is a bottom plan view of the portion shown in Fig. 2;

Fig. 4 is a section through the binder on the line 4—4 of Fig. 2;

Fig. 5 is a vertical longitudinal section through a binder of the spring cover type;

Fig. 6 is a vertical section on the line 6—6 of Fig. 5;

Fig. 7 illustrates the booster levers as applied to a binder of the wire arch frame type shown in a bottom plan view; and Fig. 8 is an enlarged vertical longitudinal section on the line 8—8 of Fig. 7.

The binder illustrated in Figs. 1, 2, 3 and 4 comprises a spring back 11, having hooked margins 12 and 13, in which are retained the toggle plates 14 and 15. The cover plate 16 encloses the mechanism and gives it a finished appearance. The binder is held to the book back by means of a metal loop 17, struck up from the metal back plate 18, which passes through an aperture 19 in the spring back 11, and is locked in position by the key 21.

Two transverse ribs 22 may be formed across the cover plate 16, adjacent its ends, to increase the stiffness of the cover at this point, and they also prevent the paper leaves from sticking on the head of the rivet.

As indicated in the figures, the booster lever 23 comprises a thumb arm 24, and an operating arm 25, which is downwardly bent so as to give clearance to the lever when tilted about its pivot. The arm 25 projects through slots 26, 26, cut in the toggle plates 14 and 15, and terminates in a head 27, which engages the underside of the plates. Between the two ribs 22 a single rivet 28, or its equivalent, holds the booster lever suspended from the cover plate and provides a pivot point around which it may rotate. Pressure upon the thumb arm 24, therefore, lifts the toggle plates and causes the prongs 29 to separate.

The method of attachment of booster levers to binders deriving their spring action from the cover plate itself is shown in Figs. 5 and 6, and is the same as that previously shown. With springs of this type the presence of the transverse ribs 31 is quite desirable, since it prevents an undue flattening of the spring cover 32 when the booster lever 33 is depressed.

But in this particular instance a dual action is secured, and the opening of the prongs is brought about by the application of very little pressure to the booster levers. When the booster levers are depressed, the pressure transmitted through the rivet 34 causes the spring cover plate 32 to be flattened somewhat and its margins to spread apart. This relieves the pressure upon the toggle plates, which are then easily forced upward by the arm 35.

I prefer to hold this type of binder to the book back by means of a clip 36, which engages recesses cut in the toggle plates 37 and 38. The clip is provided with an aperture 39, through which a loop 41, struck up from the back plate, projects. A key 42 holds the binder assembled to the back.

Due to the fact that the prongs of a wire arch frame binder are formed upon the end of the arch frames, such binders are largely confined to use with the cheaper books where two arches will be satisfactory. Because this binder holds the paper at only two points the arches are located well inside of the top and bottom margins of the sheet.

A bottom plan view of such a binder is illustrated in Fig. 7, where it will be seen that the binder is composed of two identical wire arch frames 44, 44, articulated at 45, 45, and held by the curved margins 46, 46, of a channel frame 47, which forms a cover plate. The booster lever 48 may comprise a single bent piece comprising a thumb arm 49, ending in a thumb-piece 50, and a booster arm 51, having a lifting portion 52 for engagement with the arch frames 44. The booster lever is supported against the cover plate by the single rivet 53, or its equivalent, while the binder itself is held to the book back by the rivet 54, which passes through the clearance hole 55, punched through the booster lever.

I prefer that the thumb arm 50 should project above the cover plate beyond its ends, although the thumb arm may pass through a slot in the cover plate instead. The ribs 56, 56 (Fig. 8) are provided, as in the previous forms, to prevent the leaves of paper from catching on the heads of the rivets and also they materially stiffen the cover.

The arm 49, being longer than the arm 51, pressure on the thumb-piece 50 will operate at mechanical advantage to move the arch frames 44 from closed to open position.

As a rule booster levers for wire arch frame metals will be much longer than those applied to other toggle metals, and they may be given appropriate stiffness by arching transversely, as indicated in Fig. 8.

I claim as my invention—

1. A loose leaf binder having a spring cover plate, transverse ribs for stiffening the cover adjacent its ends, toggle elements enclosed by the cover, a booster lever engaging the elements and passing beneath them having a thumb arm projecting beyond the cover plate, and a rivet passing through the cover adjacent the reinforcing ribs and suspending the booster lever from the cover plate.

2. A wire arch frame binder having a booster lever comprising a thumb arm extending substantially parallel to the axis of the binder, and a booster arm having a lifting portion occupying an inferior plane with respect to the thumb arm, and a stud depending from the cover and suspending the lever therefrom at the inner end of the thumb arm.

3. In a loose leaf binder, a plate arched transversely with the crown upward, a toggle including prong-bearing members having a toggle joint beneath the intermediate portion of the plate and bearing portions confined between its sides, and a booster lever fulcrumed on the crown of the arch with one arm operatively associated with the toggle joint to raise the same and open the prongs.

4. In a loose leaf binder, a plate arched transversely with the crown upward, a toggle including prong-bearing members having a toggle joint beneath the intermediate portion of the plate and bearing portions confined between its sides, and a booster lever fulcrumed on the crown of the arch with one arm operatively associated with the toggle joint to raise the same and open the prongs, and the other arm projecting from the plate to receive the operating force.

5. In a loose leaf binder, a plate arched transversely with the crown upward, a toggle including prong-bearing members having a toggle joint beneath the intermediate portion of the plate, a rivet through the plate in the crown of the arch, a booster lever fulcrumed upon the rivet and having one arm operatively associated with the toggle joint to raise it and open the prongs.

6. In a loose leaf binder, a plate arched transversely with the crown upward, a toggle including prong-bearing members having a toggle joint beneath the intermediate portion of the plate, a rivet through the plate in the crown of the arch, a booster lever loosely mounted on the rivet below and beneath the plate.

7. In a loose leaf binder, a channel frame, a pair of prong-bearing wire arch members mounted in the channel frame and having cooperating portions forming a toggle joint spaced from the end of the channel frame, and a booster lever fulcrumed between the toggle and the end of the frame and having a lifting arm engaging the toggle joint.

8. A loose leaf binder having an arched cover plate, a pair of articulated toggle plates bearing transverse slots, a booster lever having a portion passing through the slots and a portion extending beneath the plates to lift them and an arm extending beyond the arched cover to receive pressure, and means loosely suspending the booster lever from the cover plate.

9. A wire arch frame binder having prong-bearing wire arch frames articulated to form a toggle joint, a cover engaging the arch frames, and a booster lever pivoted on the cover and having a portion engaging and adapted to lift the arch frames.

10. A loose leaf binder having a cover plate, a rivet head projecting above the normal surface of the plate, and a transverse rib formed in the cover adjacent the rivet to prevent the paper leaves from catching upon the rivet head.

11. In a loose leaf binder, a booster lever having a thumb arm and a booster arm pivoted to the cover plate of the binder by a single element passing through the lever substantially at the junction of the two arms.

12. A loose leaf binder having prong-bearing toggles, an arched spring cover receiving the toggles, and a booster lever suspended from the center of the arch and arranged to engage the toggles to force them upwards and simultaneously to flatten the spring and thereby relieve the pressure applied by the spring to the toggles.

In testimony whereof I affix my signature.

JAMES C. DAWSON.